(12) United States Patent
Hu et al.

(10) Patent No.: US 9,213,425 B1
(45) Date of Patent: *Dec. 15, 2015

(54) METHOD AND APPARATUS FOR INTERACTING WITH ELECTRONIC DISPLAY BOARD

(71) Applicants: WUHAN SPLENDID OPTRONICS TECHNOLOGY CO., LTD, Wuhan (CN); WORSHIP HOLDINGS LIMITED, Tortola (VG)

(72) Inventors: Darwin Hu, San Jose, CA (US); Wei Zhou, San Jose, CA (US)

(73) Assignees: Wuhan Splendid Optronics Technology Co., Ltd., Wuhan (CN); Worship holdings limited (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,278

(22) Filed: Jun. 12, 2014

Related U.S. Application Data

(63) Continuation of application No. 12/203,893, filed on Sep. 3, 2008, now Pat. No. 8,754,851.

(51) Int. Cl.
*G06F 3/03* (2006.01)
*G06F 3/0354* (2013.01)

(52) U.S. Cl.
CPC .............. *G06F 3/03545* (2013.01); *G06F 3/03* (2013.01)

(58) Field of Classification Search
USPC .................................................. 345/156–184
See application file for complete search history.

(56) References Cited

U.S. PATENT DOCUMENTS

| | | | |
|---|---|---|---|
| 2004/0160420 A1* | 8/2004 | Baharav et al. | 345/173 |
| 2006/0033711 A1* | 2/2006 | Kong | 345/157 |
| 2006/0197756 A1* | 9/2006 | Sun | 345/179 |
| 2008/0106517 A1* | 5/2008 | Kerr et al. | 345/158 |
| 2010/0113153 A1* | 5/2010 | Yen et al. | 463/37 |

* cited by examiner

*Primary Examiner* — Ryan A Lubit
(74) *Attorney, Agent, or Firm* — Joe Zheng

(57) ABSTRACT

Techniques for interacting with an electronic display board are disclosed. According to one embodiment, a remote controller includes a laser generator, several motion sensors, a Micro Central Unit has data process capability and memory inside to store programs and a transceiver or a transmitter. A laser beam from the laser generator facilitates a writing movement on the electronic data board, the motion sensors detect the movement of the remote controller, and the MCU calculate the sensor data to derive the movement, the transmitter transmits the movement from the controller to the electronic data board. In accordance of the detected movement, the movement of the remote controller corresponding to the laser is electronically represented on the electronic display board.

13 Claims, 7 Drawing Sheets

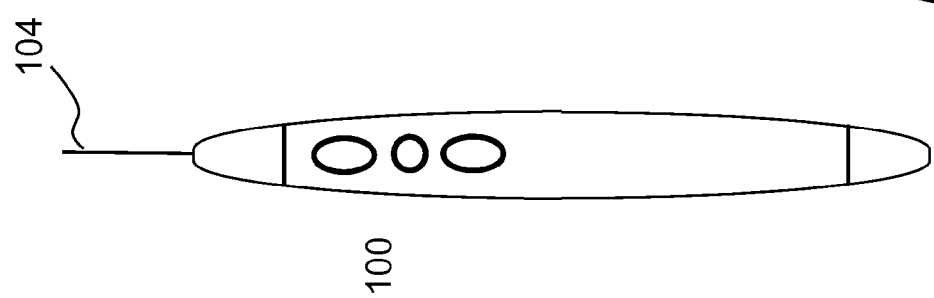

METHOD AND APPARATUS FOR INTERACTING WITH ELECTRONIC DISPLAY BOARD

BACKGROUND OF THE INVENTION

1. Field of the Invention

The present invention is related to the area of remote controls. More particularly, the present invention is related to techniques of using a uniquely designed controller to interact with a big screen or so called a databoard of electronic display with a representation of a movement of the controller.

2. Description of the Related Art

A chalkboard or blackboard is a reusable writing surface on which text or drawings are made with chalk or other erasable markers. An alternative to a blackboard is a whiteboard (also known as a markerboard, dry-erase board, dry-wipe board or a pen-board) that is a name for any glossy surface, most commonly colored white, where non-permanent markings can be made. These days electronic data boards start to be popular. An electronic data board has the advantages of getting presentation materials prepared well advanced and displaying the presentation materials in many ways that are not possible on the blackboard and whiteboard.

However, one of the problems for the electronic data board is the lacking mechanism of impulsive writing. It is generally hard to write on an electronic data board that may come in form of a CRT, a front or rear projection screen, and an LCD/plasma display. One possible solution is to provide sensors around a display screen to sense a position of a writing instrument, thus often requiring a presenter to face backwards to the audience and writing against the display surface of the electronic display board, substantially confining the movement of a presenter.

Thus there is a need for techniques that allow a presenter to walk interactively around the audience but are still able to directly interact with an electronic data board whenever there is a need.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The invention pertains to a remote controller interacting with an electronic data board. The remote controller includes a laser generator, at least two motion sensors (e.g. a three-axis linear accelerometer and a dual-axis angular rate sensor or gyroscope) to sense all kinds of controller movement, a micro control unit (MCU) configured to determine a movement of the remote controller from the sensing data from at least two motion sensors, and a transceiver or a transmitter.

A laser beam from the laser generator may be used to calibrate the controller if there is a need. When a user activates a calibration button, a calibration program is executed in the controller and/or a base computer. The calibration program will guide the user to point the laser beam at several predefined positions on a screen, or follow a sequence of the positions. The MCU/base computer is configured to automatically calculate suitable calibrated parameters for the controller according to the movement of the laser beam and the data from the motion sensors to complete the calibration procedure. The laser beam is preferably visible, the use of a visible laser beam is to act as a pointer when a user wants to pinpoint at a particular portion of the electronic data board.

The motion sensors detect the movement of the remote controller, the MCU receives the data from sensors, calculate and generate the cursor information, the transmitter transmits cursor information from the controller to a base device. According to such a detected movement, the motion of the remote controller causes to generate a corresponding cursor movement to be displayed on the electronic data board.

According to one aspect of the present invention, three axis linear accelerometers and a dual-axis angular rate sensor (gyroscope) are used to generate the sensor data for the MCU to derive a movement of the controller. One of the linear motions derived is to facilitate a zooming function when there is a need to zoom in a particular portion of a presentation being displayed. A movement derived from two linear motions and two orientations combined with predefined function keys on the controller is translated into a letter, a word or a drawing to be displayed in the electronic data board or superimposed on the presentation being displayed.

According to still another aspect of the present invention, a transparent panel is provided for a user to write thereon. The panel does not block the laser, and may be held towards the display board. By holding a controller to write against the panel may confine the movement of the controller, resulting in a better control of the controller when writing something to be displayed on the display board.

The present invention may be implemented as a method, an apparatus or a part of a system. According to one embodiment, the present invention is a controller comprising: a laser generator to project a visible laser for a user to pinpoint at a particular portion of a presentation being displayed on an electronic display board; a set of motion sensors; and a micro control unit configured to derive a movement from sensor data produced from the motion sensors; and means for transmitting the movement to a base computing device to present the movement of the controller from one location to another location on a display screen.

According to another embodiment, the present invention is a method of writing on an electronic display board, the method comprises: pointing a laser beam from a controller towards a portion of presentation being displayed on the electronic display board, the controller including a set of motion sensors, a laser generator to project a visible laser for a user to pinpoint at a particular portion of a presentation being displayed on the electronic display board, a set of motion sensors, a micro control unit configured to derive a movement from sensor data produced from the motion sensors; and means for transmitting the movement to a base computing device to present the movement of the controller from one location to another location on a display screen; and superimposing the movement onto the presentation being displayed.

The foregoing and other objects, features and advantages of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 1A shows a remote controller projecting a visible laser beam to assist a user of the controller to see a movement of the controller;

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

FIG. 1A shows a remote controller 100 projecting a visible laser beam 102 to assist a user of the controller 100 to see a movement of the controller 100. In one example, the user is an instructor presenting a set of pre-prepared multi-media materials on an electronic data board (not shown) to his audience. The electronic data board may be based on front or rear projection, plasma or LCD. As the material is being displayed, the user may refer to or highlight any particular portion of the displayed material by pointing the laser beam 104 thereto. By activating a button on the controller, the laser beam 104 controller may be used as a mouse to activate a displayed button, an event or an application. By activating another function button on the controller, the controller may be used as a remote pen to highlight the sentence on the screen, draw circle, symbol, or even write text.

As needed, the user may move the laser beam 104 (i.e., the controller 100) to follow a particular pattern, the movement is shown as a letter, word, or a trajectory on the electronic data board, often being superimposed on the displayed material being displayed. According to one embodiment, the controller 100 is designed as a pen-like instrument. A user may hold the controller 100 to write a letter, a word or draw a line, not necessarily against a writing board but in space.

Figure 1B:
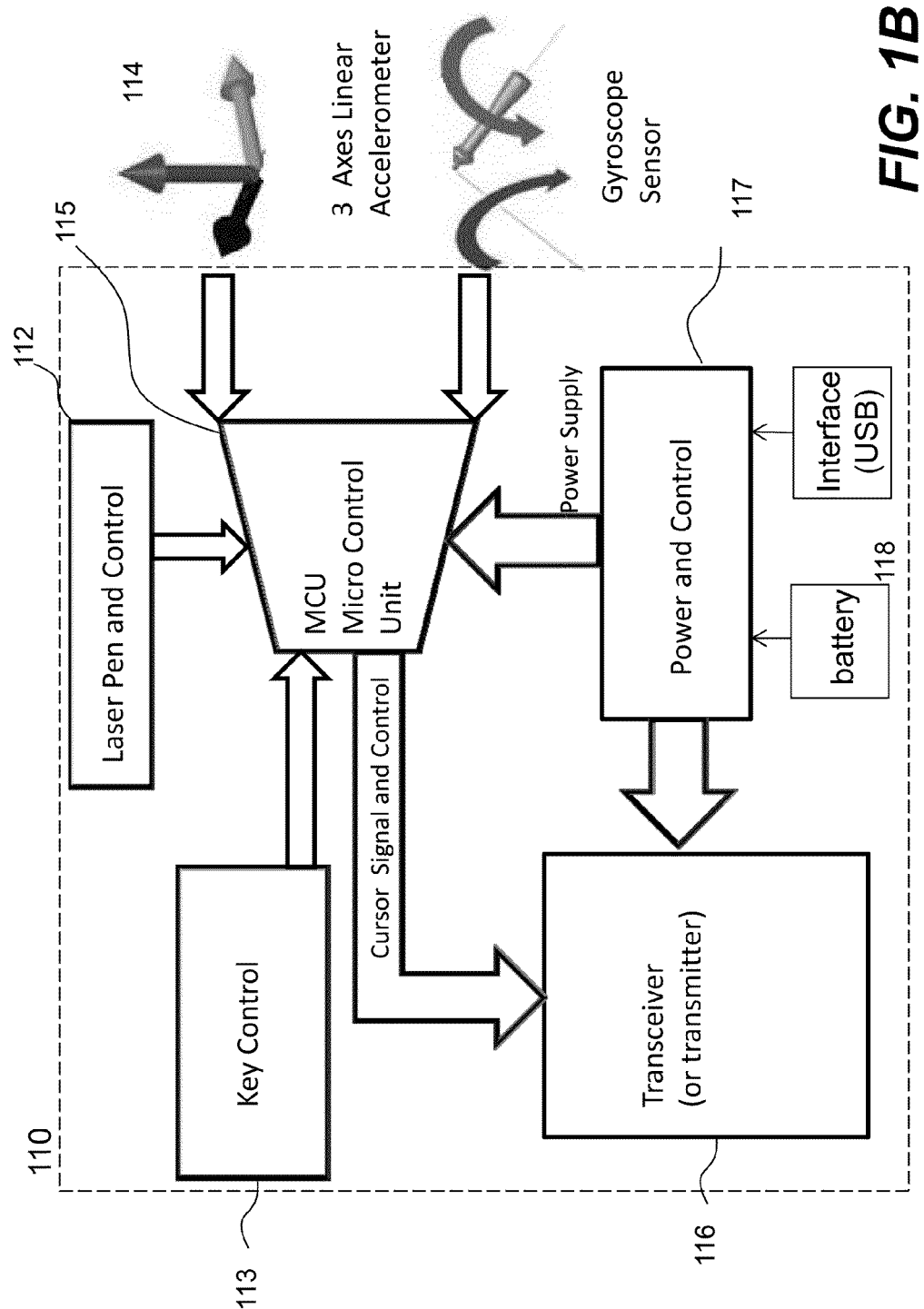
FIG. 1B shows a functional block diagram of a controller (e.g., the controller of FIG. 1A)

FIG. 1B shows a functional block diagram 110 of a controller (e.g., the controller 110 of FIG. 1A). The functional block diagram 110 includes a laser generator 112, a key control 113, a set of motion sensors 114, a micro control unit (MCU) 115 and a transmitter 116, and a power control unit 117. The laser generator 112 may include a visible red light source generating a laser beam and a lens that focuses and projects the laser beam onto a target. The motion sensors 114 include at least three accelerometers for measuring acceleration and gravity in induced reaction forces, and at least two gyroscopes for measuring orientations. The micro control unit 115 includes a memory space for storing code to derive a trajectory or movement of the controller 110 from the sensor data of the sensors 114. The transmitter 116 transmits data, a command, or an action (e.g., the derived movement of the controller) from the MCU 115 to a base computing device (not shown) to cause the computing device to react accordingly.

In one embodiment, the transmitter 116 may be replaced with a transceiver that not only transmits the data to the base computing device but also receives feedback or instruction data from the base computing device.

Figure 2:
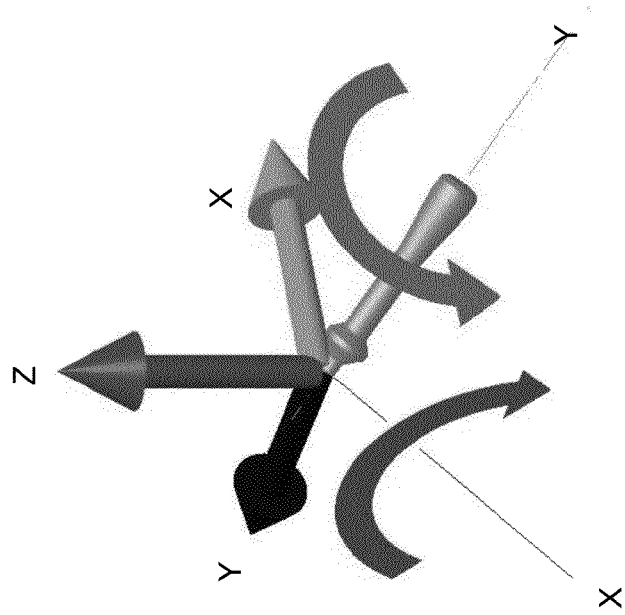
FIG. 2 illustrates three linear motions along x, y or z axis, respectively, and two orientations x or y axis that may be involved when a controller is used to write or draw something on an electronic board.

In general, using a controller (e.g., the controller 110 of FIG. 1A) to write or draw something on an electronic board involves three linear motions along x, y and z axes and two orientations x or y axis, respectively, as shown in FIG. 2. These three linear motions and two orientations can be measured by the three accelerometers and two gyroscopes in the controller. In operation, when the controller is caused to move or rotate from one location to another, the sensor data is obtained over the time of the movement from the sensors and sent to the MCU to calculate and get cursor information along with its movement according to pre-programmed calculations.

According to one embodiment, a MEMS motion sensor LIS302DL from STMicroelectronics (www.st.com) is used as three axis linear accelerometers and an Integrated X- and Y-axis gyro on a single chip IDG-300 from InvenSense, Inc., 1197 Borregas Ave., Sunnyvale, Calif. 94089 is used. Both products provide the detailed reference designs to derive corresponding measurements, which are hereby incorporated by reference.

According to another embodiment, the sensor data from the sensors is transmitted directly to a base computing device that includes a module configured to derive the movement of the controller in accordance with the received sensor data from the controller, and subsequently causes the movement to be presented or superimposed on a presentation being displayed on the electronic board.

Figure 3:
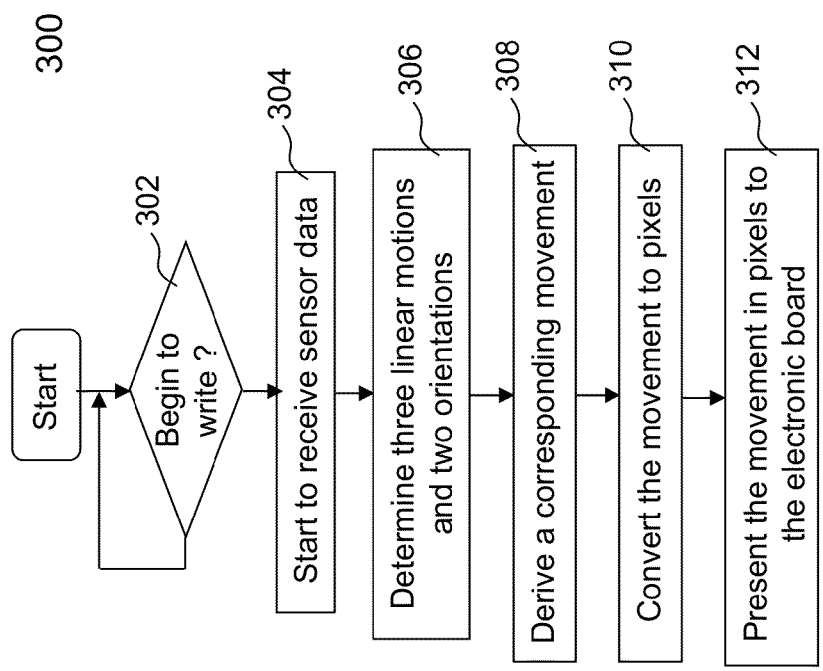
FIG. 3 shows a flowchart or process of determining a movement made by a controller and presenting the movement onto a corresponding electronic board.

FIG. 3 shows a flowchart or process 300 of determining a movement made by a controller and presenting the movement onto a corresponding electronic board. The process 300 may be implemented in hardware, software or a combination of both. According to one embodiment, the controller may be the one in FIG. 1A. A user holds the controller and pinpoints a laser beam at a particular portion of a presentation being displayed on an electronic board. When the user needs to move around or write something on top of the presentation, the user may activate a designated button on the controller. The process 300 is described below with reference to a user writing up something on a presentation.

When the user activates a designated button on the controller, the process 300 moves to 302 where the process 300 awaits the user to write up or draw something. As a result, the process 300 moves to 304. Depending on implementation, a base computing device may send a start signal to the controller that is instructed to start calculating the movement or coordinates of the controller based on the sensor data from the sensors, which case a transceiver is used, or a base computing device may simply start to receive the calculated data from the controller, in which case a transmitter is used. As the user moves the controller from one location to another (e.g., to point at one location to another, to write a letter, a word or draw a curve), the sensor data is generated, the movement of the controller is derived and transmitted to the base computing device.

Upon receiving the sensor data at 304, a module implemented in software, hardware or in combination of both being executed in the controller (e.g., an MCU) is configured to derive a movement of the controller in accordance of the sensor data being received. In one embodiment, a movement at a time t is defined as a combination of linear motions at the time t and orientations at the time t. It is assumed that there are N sets of sensor data being sampled or received in a second with the following notations: $GXi$ means an i-th linear acceleration value along X axis and $\psi Xi$ means an i-th rotation value about X axis, limited by a rotation radius L equivalent to the length of an arm, and m & n are the instant parameters. The following equation may be used in an implementation:

Movement along X axis=$X0+\Sigma(\int m*GXi*\Delta t*\Delta t+ \int n*L*\psi Xi*\Delta t)$;

Similarly,

Movement along Y axis=$Y0+\Sigma(\int m*GYi*\Delta t*\Delta t+ \int n*L*\psi Yi*\Delta t)$.

Based on the above description and exemplary equations, the three linear motions and two orientations can be determined at 306. Given the respectively calculated movements over a time, the movement of the controller can be derived at 308 and transmitted to a base computing device. At 310, the movement is superimposed upon a presentation being displayed or converted to pixels in accordance with a display resolution of the electronic display board. According to one embodiment, a button provided on the controller allows a user to set a font style, namely whether the displayed writing shall be in regular or bold. At 310, if the setting is in regular, the trajectory of the controller is displayed in one or two pixels in width. If the setting is in bold, the trajectory of the controller is displayed in three or more pixels in width. Additionally, a button may be provided on the controller to allow a user to set a color of the writing or drawing. For example, if the user decides to write a note in red on the electronic board, the pixels representing the writing are set in red. Consequently, by moving the controller in space, a trace of the controller is represented in pixels in the electronic display board.

In one embodiment, three linear motions are used to determine whether a user of the controller desires to zoom in or out of the presentation being displayed. An accelerated movement along a particular direction determined from the sensor data indicates a zoom action provided that there are no or little accelerated movements along other directions. It should be noted that the particular direction does not have to be aligned with any one of the axes x, y, and z.

Figure 4:
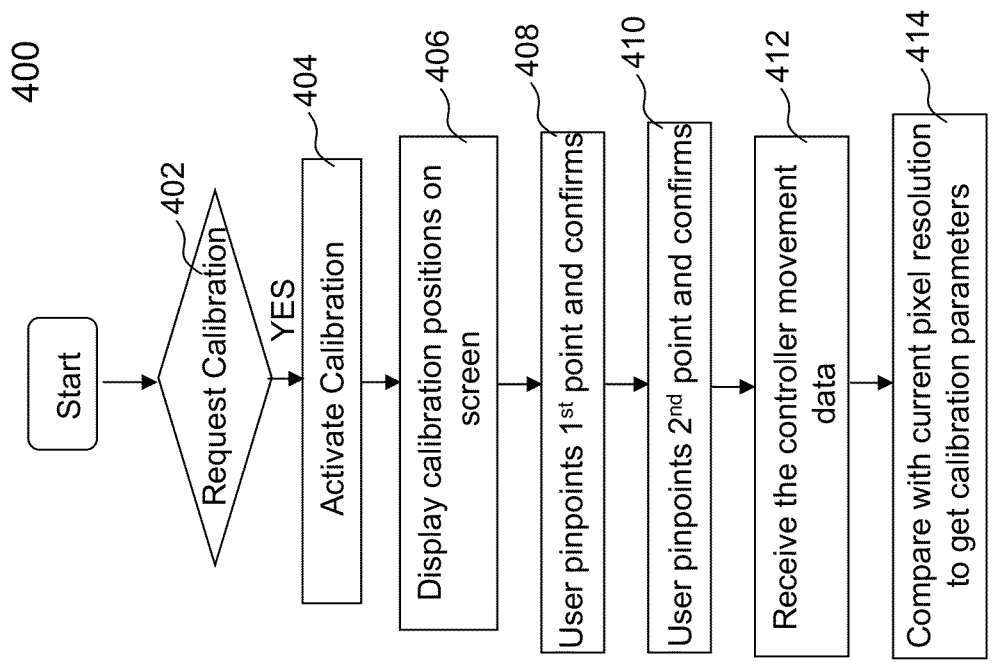
FIG. 4 shows a calibration process.

FIG. 4 shows a flowchart or process 400 of calibrating a controller. The process 400 may be implemented in software and hardware together. According to one embodiment, the controller may be the one shown in FIG. 1A. In operation, a user activates a calibration button on the controller at 402, the request is transmitted to a base computing device.

Upon receiving the calibration request at 402, a calibration program is activated and executed in the base computer at 404. The calibration program shows a set of positions (simultaneously or sequentially). At 408 and 410, the user is required to pinpoint a visible laser beam at two positions (more if necessary) in an order. As the beam moves from one position to another, the movement of the controller is received in the base computer at 412. The movement of the controller or the cursor of the laser beam is compared with what is expected, any offsets are considered into a set of calibration parameters. Depending on implementation, the process 400 may be carried out in a MCU of the controller and/or a base computer.

Figure 5:
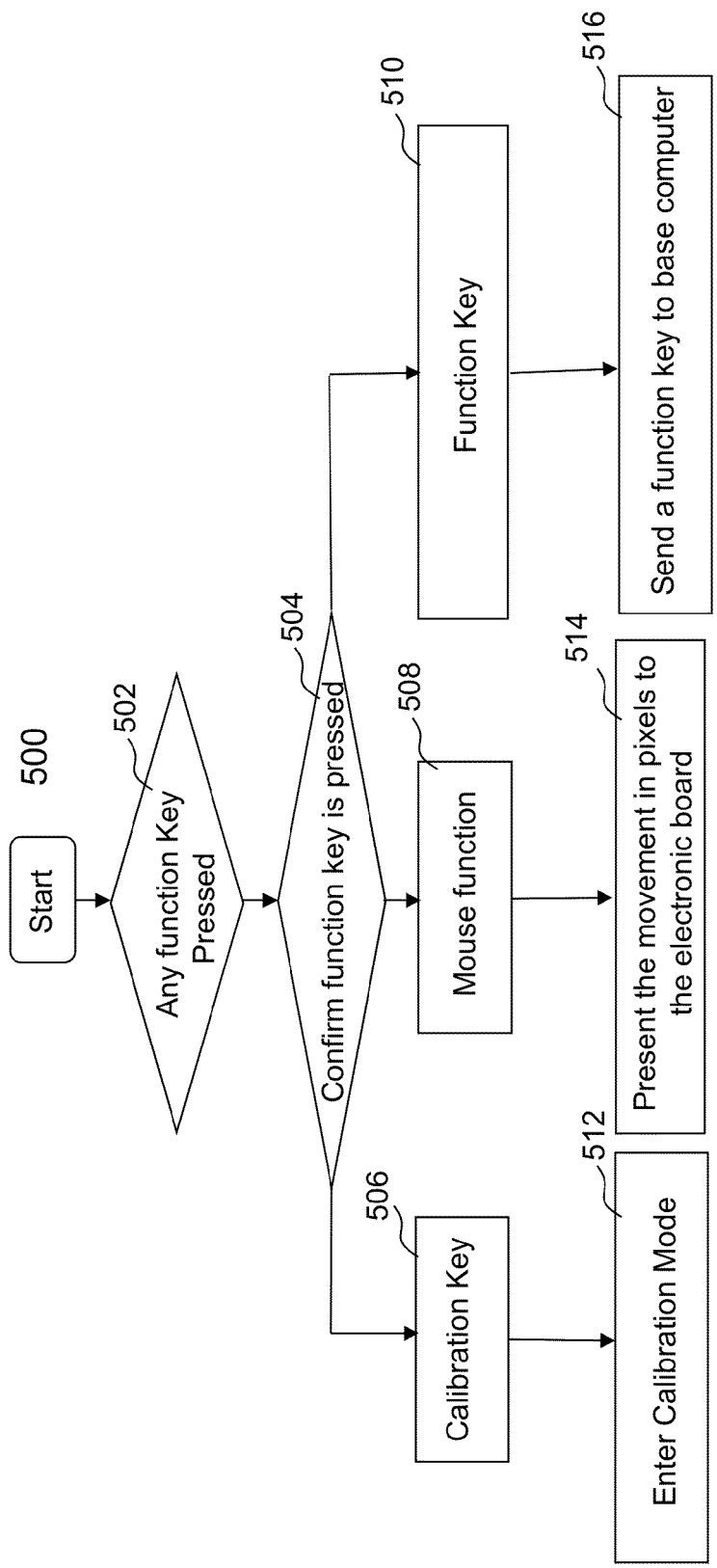
FIG. 5 shows a controller function key scan process.

FIG. 5 shows a flowchart or process 500 of how a controller supports cursors, calibration requests and some other functions requests. In operation, a user activates a functional key on a controller at 502. At 504, the controller is configured to scan keys on the controller and confirm which function key is activated (or pressed). As shown FIG. 5, there are three branches, meaning that there are at least three types of actions the controller may be caused to perform.

The first action happens when a calibration key is activated at 506. The detailed process at 512 may be described by the process 400 of FIG. 4 in one embodiment. The second action happens at 508 when a "normal" operation acts. A normal operation means that the controller is used as a mouse allowing the user to move a laser beam around a presentation, for example, pinpointing at a particular portion of the presentation or moving from one location to another. In another perspective, the controller is used as a cursor. At 514, the movement is transmitted from the controller to the base computer, where a cursor is produced and moved across a display screen or a presentation according to the movement.

If a user desires to highlight a certain portion of the display, to draw vector graphics, to paint pictures, to move or shift a page, to perform zooming in or out a portion of the display, to write characters, symbols and sentences directly on the display, any of these requests may trigger the process 510. Accordingly, a function key request is to the base computer may run an operating system or execute a software module configured to proceed with the request. As a result, the display or a presentation being displayed includes the graphic effect of the request.

Figure 6:
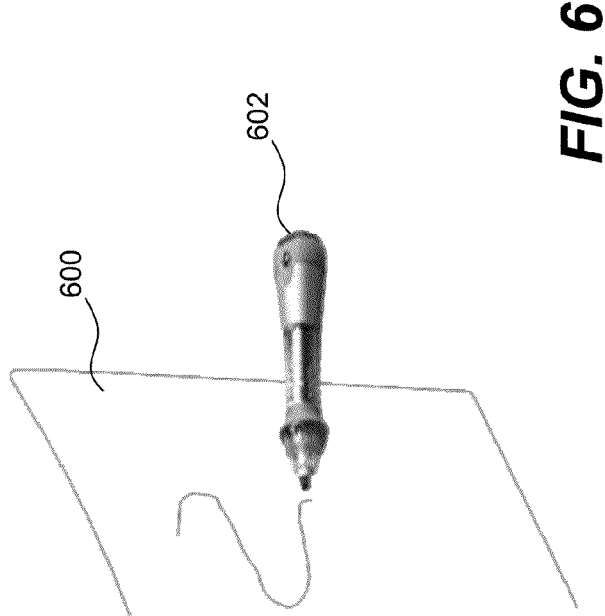
FIG. 6 shows a transparent panel that may be used to write against when a user uses a pen-like controller to write in space.

To assist the user to write comfortably, a transparent panel (e.g., glass) may be used as shown FIG. 6. The transparent panel 600 allows the laser beam to pass through but provides a feeling that the user is writing against the electronic board. The user may hold the controller 602 and write against the panel 600. The laser beam from the controller 602 passes through the panel 600 so that the audience sees the movement of the laser. As the user moves the controller against the panel 600, a letter, a word or a curve is presented on the electronic display board.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the foregoing description of embodiments.

We claim:

1. A system for interacting with an electronic display board, the system comprising:
   a base computing device coupled to the electronic display board;
   a transparent panel;
   a controller to be held by an operator standing apart from the electronic display board to remotely interact with the electronic display board, the controller including:

a housing shaped to be held in one hand of the operator of the controller, the housing having a front end for writing towards or against the transparent panel held by the operator, wherein the transparent panel is separate and apart from the electronic display board;

a laser generator to project a visible laser for an operator thereof to pinpoint at a particular portion of a presentation being displayed on the electronic display board, the visible laser going through the transparent panel;

a set of motion sensors generating sensor data when the operator uses the front end to write on the transparent panel;

a micro control unit configured to derive a movement from the sensor data produced from the motion sensors; and a transmitter for transmitting the movement to a base computing device executing a module configured to map the movement in image pixels onto the presentation being displayed on the electronic display board.

2. The system of claim 1, wherein the micro control unit is configured to keep deriving the movement as the controller is caused to move around and causes the movement to move accordingly on the electronic display board.

3. The system of claim 1, further comprising a predefined button, when the button is activated, the controller is caused to enter a calibration mode to guide the operator to project the visible laser at a predefined position of the electronic display board.

4. The system of claim 3, further including a functional button, an activation thereof indicating that a presentation of the movement of the controller is in highlight.

5. The system of claim 3, further including a functional button, an activation thereof indicating a drawing, a character, or a highlight according to the movement of the controller.

6. The system of claim 4, wherein the controller is used as a mouse allowing a user of the controller to move a laser beam around the Presentation.

7. The system of claim 4, wherein the movement of the controller is presented as a cursor on the electronic display board driven by a base computing device.

8. The system of claim 2, wherein the movement is determined by a module enclosed in base computing device from the sensor data.

9. The system of claim 1, wherein, when an accelerated movement along a direction is detected from the movement, a particular portion being pointed at by the laser beam is zoomed in or zoomed out on the electronic display board.

10. A method for remotely controlling an electronic display board, the method comprising:

projecting a visible laser beam from a controller towards a portion of presentation being displayed on the electronic display board coupled to a base computing device, the controller, being apart from the electronic display board, including a set of motion sensors, a laser generator to project the visible laser beam for a user to pinpoint at a particular portion of a presentation being displayed on the electronic display board, wherein the electronic display board and the base computing device are two separate devices and work independently, wherein said projecting a visible laser beam from a controller includes projecting the visible laser through a transparent panel being held by the user and onto the presentation being displayed on the electronic display board, the transparent panel is provided to control the motion of the controller, and wherein the transparent panel is separate and apart from the electronic display board;

guided by the visible laser beam, the controller being caused to move around the electronic display board, wherein sensor data representing motion of the controller is received in the base computing device configured to compute a trajectory of the motion of the controller, and render the trajectory in image pixels to superimpose the trajectory onto a presentation being displayed on the electronic display board.

11. The method of claim 10, further comprising: writing against the transparent panel with the controller.

12. The method of claim 11, wherein the movement is determined by a module executed in the base computing device from the sensor data.

13. The method of claim 10, further comprising:

holding a transparent panel, wherein the laser beam from the controller is going through the transparent panel, and the transparent panel is not related to the electronic display board; and using the controller to write against the panel.

* * * * *